United States Patent [19]

Spencer

[11] 4,240,407
[45] Dec. 23, 1980

[54] SOLAR ABSORBER PANEL, COLLECTOR ASSEMBLY AND INSTALLATION METHOD

[75] Inventor: Donald L. Spencer, Iowa City, Iowa

[73] Assignee: University of Iowa Research Foundation, Iowa City, Iowa

[21] Appl. No.: 859,621

[22] Filed: Dec. 12, 1977

Related U.S. Application Data

[63] Continuation-in-part of Ser. No. 670,764, Mar. 26, 1976, abandoned.

[51] Int. Cl.³ .............................................. F24J 3/02
[52] U.S. Cl. ..................................... 126/444; 126/450
[58] Field of Search ............... 126/270, 271, 450, 444, 126/447

[56] References Cited

U.S. PATENT DOCUMENTS

| | | | |
|---|---|---|---|
| 3,961,619 | 6/1976 | Estes et al. | 126/271 |
| 4,000,850 | 1/1977 | Diggs | 126/271 |
| 4,048,981 | 9/1977 | Hobbs | 126/271 |
| 4,098,331 | 7/1978 | Ford et al. | 126/271 |
| 4,112,921 | 9/1978 | MacCracken | 126/271 |
| 4,140,103 | 2/1979 | Leigh | 126/271 |

*Primary Examiner*—Carroll B. Dority, Jr.
*Attorney, Agent, or Firm*—Beveridge, DeGrandi, Kline & Lunsford

[57] ABSTRACT

A solar absorber panel assembly has a pair of substantially parallel plates sealed together at their perimeter. A raised integral header is formed in one of the plates. An external header is in fluid communication with the integral header and is spaced from and mechanically connected to the plates. A solar collector assembly includes hanger brackets mounted on an inclined support surface to engage and retain bodies of insulation material and solar absorber panels. The absorber panels are in side-by-side relation with relatively slidable slightly overlapping marginal portions. External headers on the absorber panels are connected together by slip-on resilient sleeves of silicone rubber. An enclosure having a transparent cover and a wall extending around a plurality of absorber panels and external headers is attached directly to the support surface independently of the hanger brackets and absorber panels. The cover is supported by cover support brackets mounted on the support surface and extending upwardly between panels, passing through openings formed by lateral recesses in the marginal portions of the absorber panels. A solar collector is installed by attaching hanger brackets to an inclined support surface, placing thermal insulation and absorber panels on the hanger brackets to prevent downward slipping movement, and enclosing the absorber panels with a cover which is transmissive of radiant solar energy.

28 Claims, 9 Drawing Figures

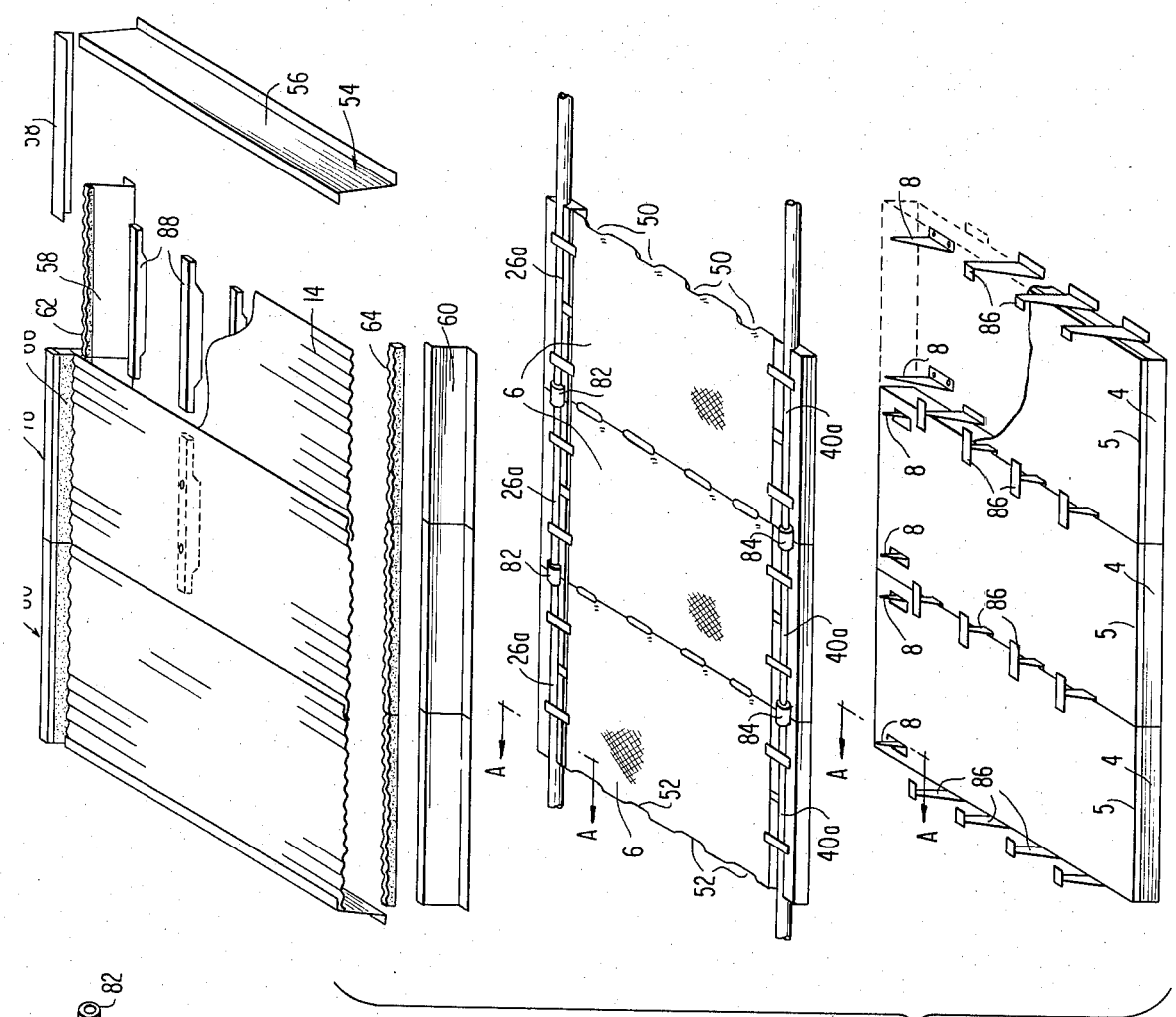
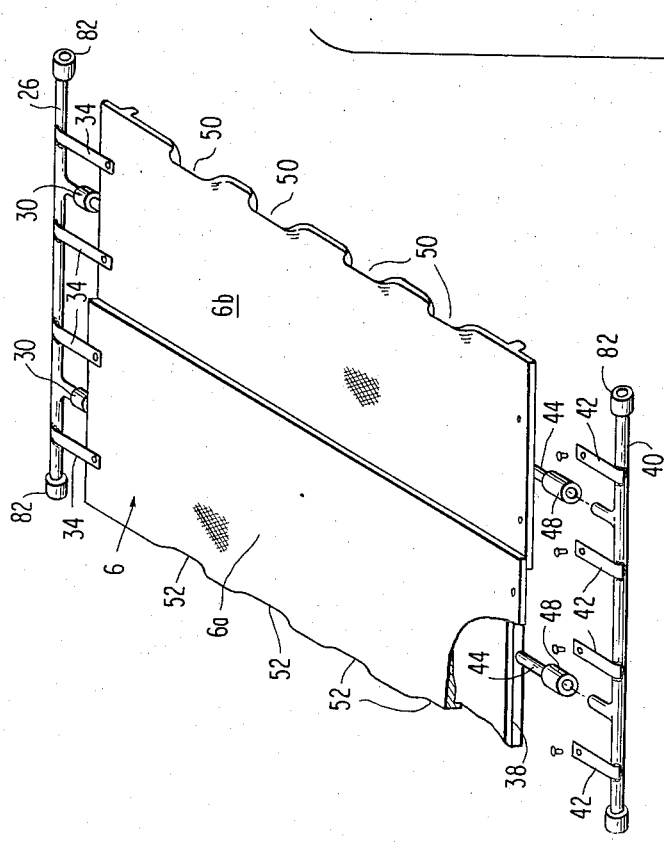
FIG. 3
FIG. 2

SOLAR ABSORBER PANEL, COLLECTOR ASSEMBLY AND INSTALLATION METHOD

REFERENCE TO RELATED APPLICATIONS

This is a continuation-in-part of U.S. application Ser. No. 670,764 filed Mar. 26, 1976 and now abandoned, the drawings and specification of which (but not the prosecution) are incorporated herein by reference. Also incorporated herein by reference is my U.S. application Ser. No. 859,619 filed Dec. 12, 1977, entitled Apparatus and Method for Collecting Solar Energy.

BACKGROUND AND SUMMARY OF THE INVENTION

This invention relates to the utilization of solar energy and particularly to a system for heating liquid by means of solar energy.

This invention pertains to the type of solar utilization system wherein a heat exchange fluid is circulated through an absorber panel located within an enclosure which has a transparent cover. Radiant solar energy is absorbed by the absorber panel and the heat so generated is carried away by the heat exchange fluid. Convective heat losses are averted by the enclosure which provides the so-called "greenhouse effect."

A customary practice in this field has been to provide preassembled units, each having a housing which serves as the enclosure and contains insulation material, an absorber panel and a transparent cover. When an array of such units is mounted on a roof or other appropriate inclined support surface, the individual units are customarily connected together by headers which lie outside the frames and are connected to an appropriate circulatory system. The construction of the individual units, their installation on a support surface and their connection to a header structure is time consuming and expensive. Perhaps more importantly, it is wasteful of the area occupied by the array since a substantial area is devoted to the frame members located within the perimeter of the array and to the header structures which most often are connected to the exterior of the frames and contribute nothing to the solar absorptive surface of the system.

The present invention is directed to a system including a novel absorber panel, a novel collector assembly and a novel method of installation. Various aspects of the invention serve individually and jointly to provide a number of advantages, presenting a highly effective system at a relatively modest expense. In some respects, the system permits and pertains to individual components which are simple and relatively inexpensive to manufacture. In another respect, the system may be installed at minimum expense on new or existing structures. Plumbing tools and techniques are not required, and installation is quick and easy.

Furthermore, the system of the invention is quite effective in operation and entails a minimum of maintenance attention due to the various structural and procedural features described herein. For example, frame elements are eliminated from within the perimeter of the array to optimize the available effective absorber surface area and avoid the loss of heat produced by the presence of the internal frame members. The main headers are preferably placed within the collector enclosure so that the header surface itself is also subjected to the incident solar energy and to the high temperatures within the enclosure. Adjacent absorber panels are overlapped so that substantially all of the area within the enclosure serves as an effective absorber surface.

In one respect, the invention pertains to a solar collector assembly having a plurality of absorber panels each being provided with a header. Means are provided for circulating fluid through the headers at subatmospheric pressure, and the headers are interconnected by resilient sleeves having their opposite ends telescoped over the headers whereby subatmospheric pressure biases the sleeves into sealing engagement with the headers.

Another inventive concept relates to a solar collector assembly having a pair of solar absorber panels located beneath a cover which is transmissive of solar radiant energy. The marginal portions of the absorber panels overlap and are provided with spaced-apart lateral recesses which provide openings through which upwardly-extending cover support brackets extend.

Another novel concept of the invention is that of placing a plurality of absorber panels within a single enclosure which has a cover transmissive of radiant solar energy, the adjacent marginal portions of the absorber panels being overlapped and slidable relative to each other to permit thermal expansion thereof.

Further, the invention pertains to a solar collector assembly in which a hanger bracket projecting upwardly from the support surface engages the absorber panel to prevent downward slipping movement of the panel. The enclosure is attached to the support surface independently of the hanger bracket and absorber panel assembly, whereby the unit is easily installed and capable of sustaining substantial relative movement due to thermal expansion.

The invention also concerns a solar absorber panel structure in which a pair of substantially parallel plates are sealed together, and one of the plates is deformed to provide a raised integral header therein. An external header is spaced from the integral header and is mechanically connected to the plates; and, a fluid connector provides a fluid passage between the external header and the raised integral header.

The installation method according to the invention involves the initial attachment of a plurality of upstanding hanger brackets to an inclined support surface, and placement of thermal insulation material on the support surface and on the upstanding hanger brackets so that the insulation material is prevented from slipping downwardly. An absorber panel assembly is placed on the insulation material and engaged with the hanger brackets to prevent the absorber panel assembly from slipping downwardly. The absorber panel assembly is then enclosed by placing thereover a cover which is transmissive of radiant solar energy.

These various inventive concepts will be understood more completely from a study of the accompanying drawings and description thereof. This specification describes only a preferred embodiment which possesses all of the claimed inventive features, but it is to be understood that these concepts may be used independently of each other in a wide variety of structures to enjoy the benefits of this invention.

BRIEF DESCRIPTION OF THE DRAWINGS

FIG. 2 is an exploded perspective view of a solar absorber panel constructed according to the invention.

FIG. 3 is an exploded perspective view of a solar collector assembly constructed according to the invention and including insulation modules, absorber panel modules and enclosure modules.

DESCRIPTION OF A PREFERRED EMBODIMENT

Figure 1:
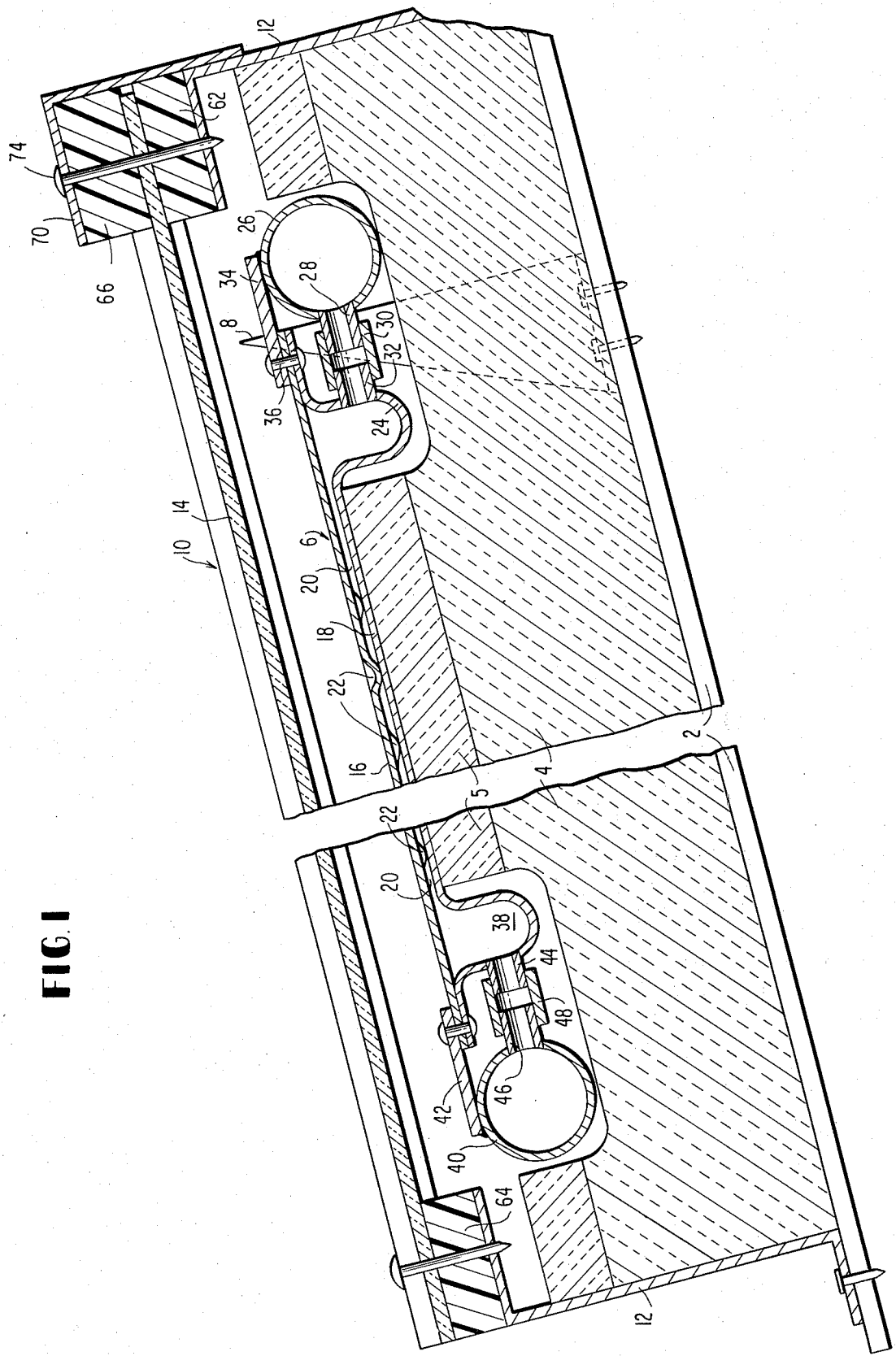
FIG. 1 is a sectional view taken through a solar collector assembly constructed according to the invention, taken along a vertical plane parallel to the flow path of liquid moving through the absorber panel.

A portion of a solar collector assembly constructed according to the invention is shown in FIG. 1, mounted on a roof or other inclined support surface 2. The assembly includes a body of rigid thermal insulation 4 lying on the support surface 2, a layer 5 of compressible insulation such as glass fibers, and an absorber panel 6 which hangs on brackets 8 and lies on the insulation layer 5.

The absorber panel 6 is located within an enclosure 10 formed of upstanding frame members 12 and a transparent cover 14 which is transmissive of solar energy. The enclosure 10 is attached directly to the support surface 2, independently of the insulation 4 and absorber panel 6.

The absorber panel 6 includes two sections each formed of substantially parallel sheets 16 and 18 seam welded together around their perimeters to provide a fluid flow passage 20 for a heat exchange fluid such as water. These sheets are formed of 304 or 444 stainless steel 0.15 mm (0.006 in.) thick having surfaces about 3 m (9.5 ft.) in length and 0.6 m (2 ft.) in width. The lower sheet 16 is planar. The upper sheet is blackened and possesses a sinisoidal deep texture pattern in which integral raised projections 22 serve as spacers to establish the thickness of the flow passage space when the liquid flowing through the panel is at subatmospheric pressure. Suitable textured sheets designated 6-WL are available from Rigidized Metals, Inc., Buffalo, N.Y. In such sheets, there are about 2.8 projections per square centimeter, and the depth from the bottom of the depressions on one side to the top of the projections on the same side is 0.7 mm (0.030 in.) This provides a flow passage 20 having a mean thickness of 0.38 mm (0.015 in.) and a maximum thickness of 0.76 mm (0.030 in.).

Incoming liquid is distributed across the upper end of the flow passage by a transversely-extending integral inlet header 24 formed by deforming the lower sheet 18 as shown in FIG. 1. A pipe 26 serves as the external inlet header and communicates with the fluid flow space 20 through tube 28, silicone rubber sleeve 30 and tube 32 on the integral header 24. The external header 26 is mechanically connected to sheet 16 by small bars 34 which are silver soldered to the header 26 and connected to the plates 16 and 18 by bolt or rivet fasteners 36. Resilient sleeve 30 permits longitudinal extension of the fluid connection between the headers 24 and 26 to prevent stresses which otherwise would occur upon expansion of the mechanical connector bars 34. As the liquid passing through the sleeve 30 is under subatmospheric pressure, the sleeve is biased into sealing engagement with the tubes 28 and 32 so that compressive devices such as hose clamps are not used.

The lower end of the absorber panel 6 is substantially a mirror image of the upper end, being provided with a raised integral outlet header 38, an external outlet header 40 mechanically connected to the plates 16 and 18 by connector bars 42, and tube-and-sleeve fluid connector means extending between the external and internal headers. Tubes 44 on the integral header 38 are connected to tubes on the external header 40 by silicone rubber sleeves 48.

The external headers 26 and 40 are shorter than the panel, measured parallel to the headers, thus enabling adjacent absorber panels to lie in a side-by-side relationship with overlapped marginal portions.

As shown in FIG. 2, each absorber panel 6 is formed of two panel sections 6a and 6b, the adjoining marginal edges of which overlap to avoid any "dead" spaces and to maximize the available area backed by the fluid flow passages. The marginal portions of the panel are locally upturned to provide lateral recesses 50 on the right edge of the absorber panel; and, they are locally downturned to provide lateral recesses 52 on the left edge of the module. When the edges of two plates are overlapped, the recesses 50 and 52 provide an opening for cover support brackets of the type described later in this specification.

As previously mentioned, the thermal insulation between the support surface 2 and the absorber panel 6 is formed of a rigid body 4 and a compressible layer 5 formed of glass fiber thermal insulation. Body 4 is preferably rigid polyurethane board having a thickness of approximately 7.5 cm. (3 in.). The compressible layer 5 has a thickness of about 2.5 cm. (1 in.).

The overall structure of the enclosure portion of the collector assembly is best shown in the exploded view of FIG. 3. It is formed of a series of modules, each corresponding generally in width to an absorber panel 6. The right enclosure module 54 has a frame formed of an end piece 56, an upper piece 58 and a lower piece 60. The upper flanges of pieces 58 and 60 support filler pieces 62 and 64 which have undulating upper surfaces corresponding to the contour of the corrugated cover 14. As best seen in FIG. 1, there are corresponding filler pieces 66 and 68 which overlie the upper and lower margins of the cover. Cap piece 70 is placed over the filler piece 66 and is affixed to piece 58 by sheet metal screws 74.

The cover 14 must be formed of a material which is transmissive of solar radiation, one suitable material being the illustrated corrugated 548 Filon Supreme, manufactured by Filon Division of Vistron Corporation, Hawthorne, Calif. The width of each cover section is slightly greater than the width of its associated upper and lower pieces 58 and 60 so that the cover sections will overlap when in their final assembled condition as shown in FIG. 3.

The center enclosure module is designated 78 in FIG. 3, and it is constructed substantially the same as the module 54 except that it has no end piece 56. The left enclosure module 80 is substantially the same as right module 54 but it is disposed as a mirror image thereof. Prior to arrival at the job site, each module 54, 78 and 80 is completely preassembled so that it may be placed as a complete unit over the components previously mounted on the support surface.

In the exploded view of FIG. 3, the absorber panels are slightly different from those shown in FIG. 2, in that each panel is formed of a single section rather than two overlapped sections. Here, it will be noted that resilient silicone rubber sleeves 82 interconnect the upper external headers 26a while corresponding sleeves 84 connect the external outlet headers 40a. Operation of the system at subatmospheric pressure biases these sleeves 82 and 84 into sealing engagement on the headers 26a and 40a.

Figure 4:
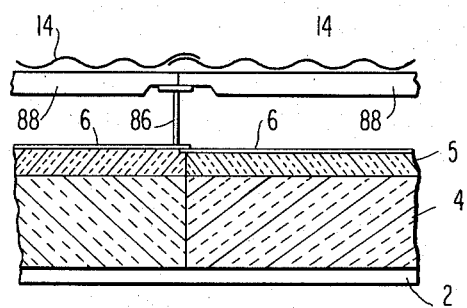
FIG. 4 is a sectional view which shows the overlapping relation between adjacent absorber panels in a collector assembly constructed according to the invention.

The absorber panels are arranged to optimize the exposed effective surface area thereof and to minimize the effect of thermal expansion when subjected to temperature changes. Specifically, as shown in FIG. 4, the individual absorber panels 6 are arranged in side-by-side relation with their marginal portions overlapped and slidable relative to each other. Further, the resilient sleeves 82 and 84 which interconnect the headers 26 and 40 serve as extensible connectors preventing stresses in the external headers 40 when thermal expansion occurs.

Due to the span of the enclosure cover 14, it is desirable to provide it with some form of intermediate support in addition to the edge support afforded by the frame. For this purpose, there are a plurality of cover support brackets 86 shown in FIGS. 3 and 5. Each of these brackets 86 has a lower flange nailed to the underlying support surface and an upper flange for supporting the cover. As shown in FIG. 3, purlins 88 have end recesses which receive the upper horizontal flanges of the brackets 86 to provide adequate support for the cover 14.

Figure 5:
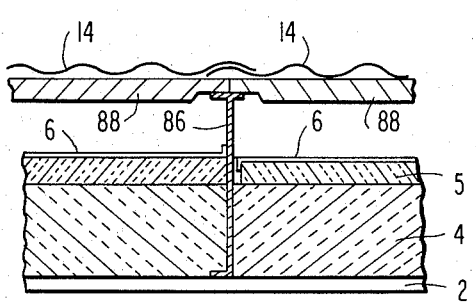
FIG. 5 is a sectional view showing a cover support bracket extending between adjacent overlapped absorber panels.

The brackets 86 are able to extend upwardly through the array of absorber panels due to the provision of the lateral recesses 50 and 52. The recesses 50 are provided by upturning local marginal portions on the right side of the absorber panel, while the recesses 52 are provided by downturning local portions on the left margin of the respective panels. These recesses provide openings through which the cover support brackets 86 extend as shown in FIG. 5.

Apart from being relatively simple and inexpensive to manufacture, the disclosed apparatus lends itself to a very uncomplicated and inexpensive installation procedure which is illustrated in diagrammatic form in FIG. 6.

Figure 6A:
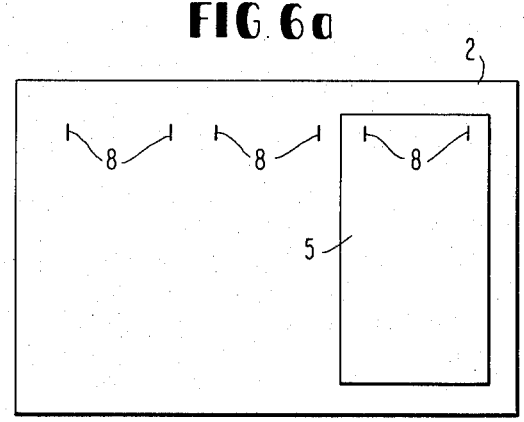
FIGS. 6a, 6b and 6c show diagrammatically various stages in the installation of a solar collector assembly constructed according to the invention.

Prior to installation, each of the modules is pre-assembled, so that workmen arrive at the site with brackets, insulation modules, absorber panel modules and enclosure modules. On site, the hanger brackets 8 are first attached to the roof or any appropriate south-facing inclined surface 2. The brackets 8 are arranged in a straight line which is horizontal or with a slight downward inclination toward the outflow end of the array for proper draining. Next, the right insulation module having the upper compressible layer 5 is placed over the right pair of brackets 8 as shown in FIG. 6a, the brackets extending into preformed openings in the insulation module to prevent the insulation from slipping downwardly on the support surface 2.

Figure 6B:
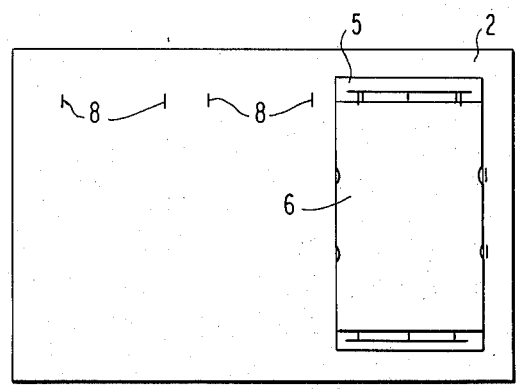

The next stage of installation shown in FIG. 6b involves the placement of the right absorber panel 6 over the body of insulation, with the upper external inlet header of the right absorber panel hanging directly on the brackets 8 to prevent it from slipping downwardly. The right absorber panel is then wired in place.

Figure 6C:
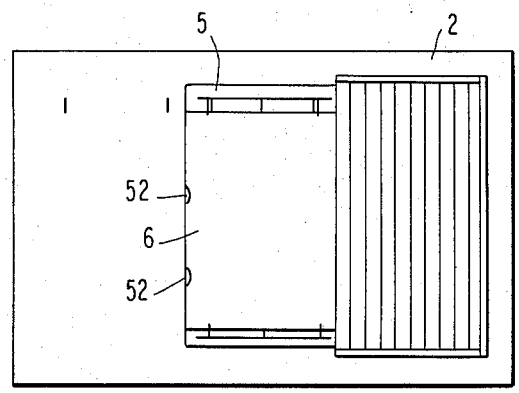

The next stage, the completion of which is shown in FIG. 6c, involves the placement of the right enclosure module over the right absorber plate. After initial placement of the enclosure module over the absorber plate, the enclosure module support brackets 86 are inserted in the purlin ends on both sides of the right absorber panel, and attached to surface 2. In this step, the brackets 86 are positioned in the lateral recesses 52 of the right absorber panel. The flexibility of the cover allows the frame end piece 56 to be lifted out of the way during installation of the brackets. Then the frame of the right enclosure module is attached directly to the surface 2, independently of the underlying brackets 8 or absorber panel 6. Then, the center insulation module is placed on the hanger brackets 8. The center absorber panel is placed over the center insulation module, with the center absorber panel having its right marginal portion overlying the left marginal portion of the right absorber panel. The lateral recesses 50 on the center absorber panel 6 receive the cover support brackets 86 so that the right and center panels form an opening for the cover support brackets 86. During placement of the center absorber panel, the connector sleeves 82 and 84 are slipped over the aligned headers to provide the connections as shown in FIG. 3.

Continuing with the installation, the central cover support purlins are placed on the brackets 86 and the center enclosure module is placed over the center absorber panel, with the right edge of its cover overlapping the left edge of the right cover section. The left section is completed by placing the insulation over the corresponding hanger brackets 8, placing the left absorber panel over the insulation while making fluid connections with the headers of the adjoining panels. The lateral recesses 50 of the left absorber panel receive the adjacent cover support brackets. The leftmost row of cover support brackets 86 is nailed to the surface 2, purlins are placed thereon to span the left absorber panel, and the left enclosure module is then placed over the left absorber panel and fastened to the support surface. The cover of the left enclosure module overlaps the cover of the center enclosure module. The entire unit may be calked, inlet and outlet ducts attached by slip-on silicone rubber connectors to the headers, a solenoid valve connected to the upper header system and appropriate temperature sensors added to the unit. The covers are connected together where they overlap, and edge insulation is added at the frame end pieces.

Figure 7:
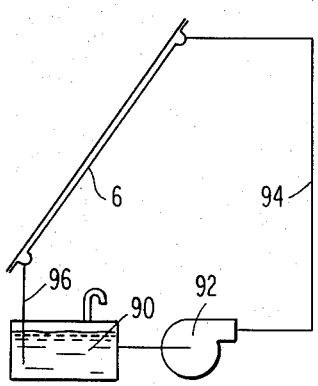
FIG. 7 is a diagrammatic view of a preferred circulatory system used to establish subatmospheric pressure within the solar absorber panels.

Preferably, the circulatory system for the collector assembly causes the liquid pressure within the absorber panels 2 to be at subatmospheric pressure. This reduces the pressure requirements of the apparatus, eliminates the need for freeze protection and causes the sheets which form the absorber panels to move toward each other to establish an appropriately-dimensioned flow passage 20. A suitable circulatory system, shown in FIG. 7, includes a reservoir 90, a pump 92 taking suction from the reservoir and delivering liquid under low pressure to the feed line 94. The size, length and/or height of the feed line 94 is such that a subatmospheric pressure will exist at the upper inlet end of the absorber panel 6. This subatmospheric condition persists throughout the length of the absorber panel. Liquid emerging from the absorber panel outlet header is carried by return line 96 to a submerged point in the reservoir 90, forming a loop seal which prevents air from backing up into the return line.

Persons familiar with this art will realize that the invention may take a wide variety of forms other than the preferred embodiment shown herein. It is envisioned that the covers may be formed of glass panels, in which event the cover support bracket 86 will support inclined longitudinal runners which underlie the marginal edges of the glass panels. As the advantages of the invention may be realized by utilizing the inventive concepts singularly rather than together as described herein, it is emphasized that the invention is not limited solely to the disclosed embodiments but is encompassing of modifications thereto and variations thereof which fall within the spirit of the following claims.

I claim:

1. A solar collector assembly comprising,
   a pair of solar absorber panels each having a fluid flow passage for a heat exchange fluid,
   said solar absorber panels lying in side-by-side relation with their marginal portions in overlapping relation, said marginal portions having spaced-apart lateral recesses providing openings between said panels,
   cover support brackets extending upwardly through said openings, and
   a cover transmissive of solar radiant energy, said cover being supported on said cover support brackets.

2. A solar collector assembly comprising,
   a plurality of substantially planar absorber panels each having a fluid flow passage therein for a heat exchange fluid, said absorber panels having their adjacent marginal portions overlapped and slidable laterally toward and away from each other to permit thermal expansion thereof,
   an enclosure means having a transparent covering enclosing said panels, said enclosure means having a wall which extends around a plurality of said panels and a cover which is transmissive of radiant solar energy,
   each of said panels having an inlet header and an outlet header both of which are located within said enclosure means, said headers being in fluid communication with the flow passages of their respective panels, and
   fluid connector means interconnecting said headers of adjacent said panels, said fluid connector means including a resilient sleeve having its opposite ends telescoped over said headers.

3. The solar collector assembly of claim 2 having means for circulating liquid through said headers at subatmospheric pressure, whereby subatmospheric pressure biases said sleeve into sealing engagement with the headers.

4. A solar collector assembly mountable on an inclined support surface, comprising,
   stationary hanger brackets projecting upwardly from the support surface,
   a plurality of side-by-side absorber panel assemblies each having a fluid flow passage therein for a heat exchange fluid, each said absorber panel assembly lying above said support surface and being engaged by a said hanger bracket to prevent downward slipping movement of the absorber panel assembly relative to said support surface,
   enclosure means having a cover transmissive of radiant solar energy, said enclosure means enclosing said hanger brackets and said absorber panel assemblies, said enclosure means being attached to said support surface independently of said hanger brackets and said absorber panel assemblies,
   cover support brackets within said enclosure, said cover support brackets extending upwardly from the support surface and above said absorber panel assembly, said absorber panel assemblies having longitudinal marginal portions provided with lateral recesses, said cover support brackets lying in said lateral recesses,
   said absorber panel assemblies having their longitudinal marginal portions in overlapping relation except at said recesses.

5. The solar collector assembly of claim 4 having a body of thermal insulation material within said enclosure means and between said support surface and a said absorber panel assembly.

6. The solar collector assembly of claim 4 in which a said solar panel assembly includes a pair of substantially parallel plates providing therebetween said fluid flow passage, one of said plates being deformed to provide a raised integral header, an external header spaced from said raised integral header, mechanical connector means attaching said external header to said plates to maintain a substantially constant distance between said external header and said raised integral header, and fluid connector means providing a fluid passage between said external header and said raised integral header.

7. The solar collector assembly of claim 6 wherein one of said connector means is longitudinally extensible to prevent stresses therein resulting from thermal expansion of the other said connector means.

8. The solar collector assembly of claim 6 wherein the external header is shorter than the dimension of the plates measured parallel to the external header, two such absorber panel assemblies lying in side-by-side relation with overlapping marginal portions without interference from said external headers.

9. The solar collector assembly of claim 6 having extensible connector means connecting the external headers of two solar panels assemblies to prevent stresses in the external headers upon thermal expansion thereof.

10. The solar collector assembly of claim 9 in combination with means for circulating liquid through said external headers at subatmospheric pressure, said extensible connector means comprising a resilient sleeve having its opposite ends telescopically receiving said external headers whereby said subatmospheric pressure biases said sleeve toward sealing engagement with said headers.

11. A solar absorber panel assembly comprising,
    a pair of substantially parallel plates sealed together to provide therebetween a fluid flow passage for a heat exchange fluid, one of said plates being deformed to provide a raised integral header therein,
    an external header spaced from said raised integral header and being shorter than the dimension of the plates measured parallel to the header to permit overlapping of marginal portions of adjacent panels,
    mechanical connector means attaching said external header to said plates to maintain a substantially constant distance between said external header and said raised integral header,
    fluid connector means providing a fluid passage between said external header and said raised integral header, and
    one of said connector means being longitudinally extensible to prevent stresses therein resulting from thermal expansion of the other said connector means.

12. The solar absorber panel of claim 11 wherein the external header is shorter than the dimension of the plates measured parallel to the external header, whereby two such absorber panel assemblies may lie in side-by-side relation with overlapping marginal portions without interference from said external headers.

13. The solar absorber panel of claim 11 in combination with a second said solar absorber panel in side-by-side relation thereto, and extensible connector means connecting the external headers of the solar absorber panels to prevent stresses in the external headers upon thermal expansion thereof.

14. The solar absorber panel of claim 13 in combination with means for circulating liquid through said external headers at subatmospheric pressure, said extensible connector means comprising a resilient sleeve having its opposite ends telescopically receiving said external headers whereby said subatmospheric pressure biases said sleeve toward sealing engagement with said headers.

15. The solar absorber panel of claim 11 having lateral recesses in marginal portions of said plates whereby cover-support brackets may lie between side-by-side overlapped solar absorber panels.

16. The solar absorber panel of claim 15 in combination with a second said solar absorber panel, said solar absorber panels having marginal portions in overlapping relation, and upstanding cover support brackets extending upwardly through said lateral recesses to support a cover thereabove.

17. A method of on-site installation of a solar collector on an inclined support surface comprising the steps of,
attaching a plurality of upstanding hanger brackets to the support surface,
placing a body of thermal insulation material on said support surface, at least one said upstanding hanger brackets extending into said body of thermal insulation material to prevent said body of thermal insulation material from slipping downwardly on said support surface,
placing an absorber panel assembly on said body of thermal insulation material and engaging said absorber panel assembly with at least one of said upstanding hanger brackets to prevent said absorber panel assembly from slipping downwardly on said body of thermal insulation material,
said absorber panel assembly having a fluid flow passage therein for a heat exchange fluid,
enclosing said absorber panel assembly by placing thereover a cover which is transmissive of radiant solar energy,
said absorber panel assembly including an upper header conduit at the upper end of said assembly, a pair of substantially parallel plates providing said fluid flow passage therebetween, and connector means affixing said plates to said header conduit and providing a space between said plates and said header conduit, said step of engaging the absorber panel assembly with a hanger being performed by engaging said upper header against said hanger, with said hanger extending into said space between said plates and said header conduit.

18. The method of claim 17 in which a plurality of said absorber panel assemblies are placed in side-by-side relation, including the further step of attaching a plurality of cover support brackets to the support surface, said step of placing the absorber panel assembly on the body of thermal insulation also including the placement of inclined marginal portions of said absorber panel assembly in a position where they extend laterally beyond said cover support brackets to avoid gaps between adjacent panel assemblies, said step of placing a cover over said absorber panel assemblies being performed by placing said cover over the cover support brackets.

19. The method of claim 18 including the step of attaching transverse purlins to said cover support brackets, said cover being placed on said purlins.

20. The method of claim 17 in which a plurality of said cover support assemblies are placed in side-by-side relation, and in which each of said collector panel assemblies includes a laterally-oriented header communicating with its fluid flow passage, including the step of placing the opposite ends of an elastomer sleeve over the headers of adjacent collector panel assemblies.

21. A pair of absorber panel assemblies lying in side-by-side relationship with overlapping marginal portions, each of said solar panel assemblies comprising:
a pair of substantially parallel plates sealed together to provide therebetween a fluid flow passage for a heat exchange fluid, one of said plates being deformed to provide a raised integral header therein,
an external header spaced from said raised integral header and being shorter than the dimension of the plates measured parallel to the internal header to permit said overlapping of the marginal portions,
mechanical connector means attaching said external header to said plates to maintain a substantially constant distance between said external header and said raised integral header, and
fluid connector means providing a fluid passage between said external header and said raised integral header.

22. The apparatus of claim 21 mountable on an inclined support surface and including stationary hanger brackets projecting upwardly from the support surface, said absorber panel assemblies lying above said support surface and being engaged with said hanger brackets to prevent downward slipping movement of the absorber panel assemblies relative to said support surface.

23. The apparatus of claim 22 including enclosure means having a cover transmissive of radiant solar energy, said enclosure means enclosing said hanger brackets and said absorber panel assemblies, said enclosure means being attached to said support surface independently of said hanger bracket and said absorber panel assembly.

24. The apparatus of claim 22 wherein said stationary bracket assemblies are engaged with said external headers.

25. A solar collector assembly mountable on an inclined support surface, comprising,
stationary hanger brackets projecting upwardly from the support surface,
a plurality of side-by-side absorber panel assemblies each having a fluid flow passage therein for a heat exchange fluid, each said absorber panel assembly lying above said support surface and being engaged by a said hanger bracket to prevent downward slipping movement of the absorber panel assembly relative to said support surface,
enclosure means having a cover transmissive of radiant solar energy, said enclosure means enclosing said hanger brackets and said absorber panel assemblies, said enclosure means being attached to said support surface independently of said hanger brackets and said absorber panel assemblies, a said solar panel assembly including a pair of substantially parallel plates providing therebetween said fluid flow passage, one of said plates being deformed to provide a raised integral header, an external header spaced from said raised integral header, mechanical connector means attaching said external header to said plates to maintain a substantially constant distance between said external header and said raised integral header, and fluid connector means providing a fluid passage between said external header and said raised integral header, one of said connector means being longitudinally extensible to prevent stresses therein resulting from thermal expansion of the other said connector means.

26. A solar collector assembly mountable on an inclined support surface, comprising, stationary hanger brackets projecting upwardly from the support surface, a plurality of side-by-side absorber panel assemblies each having a fluid flow passage therein for a heat exchange fluid, each said absorber panel assembly lying above said support surface and being engaged by said hanger bracket to prevent downward slipping movement of the absorber panel assembly relative to said support surface, enclosure means having a cover transmissive of radiant solar energy, said enclosure means enclosing said hanger brackets and said absorber panel assemblies, said enclosure means being attached to said support surface independently of said hanger brackets and said absorber panel assemblies, a said solar panel assembly including a pair of substantially parallel plates providing therebetween said fluid flow passage, one of said plates being deformed to provide a raised integral header, an external header spaced from said raised integral header, mechanical connector means attaching said external header to said plates to maintain a substantially constant distance between said external header and said raised integral header, and fluid connector means providing a fluid passage between said external header and said raised integral header, said external header being shorter than the dimension of the plates measured parallel to the external header, two such absorber panel assemblies lying in side-by-side relation with overlapping marginal portions without interference from said external headers.

27. A solar absorber panel assembly comprising, a pair of substantially parallel plates sealed together to provide therebetween a fluid flow passage for a heat exchange fluid, one of said plates being deformed to provide a raised integral header therein, an external header spaced from said raised integral header, mechanical connector means attaching said external header to said plates to maintain a substantially constant distance between said external header and said raised internal header, fluid connector means providing a fluid passage between said external header and said raised integral header, said external header extending substantially in the same direction as said internal header and being shorter than the dimension of the plates measured lengthwise of the external header, two such absorber panel assemblies lying in side-by-side relation with overlapping marginal portions without interference from said external headers; fluid connector means connecting adjacent external headers.

28. A solar absorber panel assembly comprising, a pair of solar absorber panels each of which includes a pair of substantially parallel plates sealed together to provide therebetween a fluid flow passage for a heat exchange fluid, one of said plates being deformed to provide a raised integral header therein, said plates having lateral recesses in their marginal portions, said solar absorber panels having marginal portions in overlapping relation, and upstanding cover support brackets extending upwardly through said lateral recesses to support a cover thereabove, an external header spaced from said raised integral header and being shorter than the dimension of the plates measured parallel to the header to permit said overlapping of the marginal portions, mechanical connector means attaching said external header to said plates to maintain a substantially constant distance between said external header and said raised integral header, and fluid connector means providing a fluid passage between said external header and said raised integral header.

* * * * *